United States Patent
Adams et al.

(10) Patent No.: US 8,201,235 B2
(45) Date of Patent: *Jun. 12, 2012

(54) SYSTEM AND METHOD FOR REDUCING DATA STREAM INTERRUPTION DURING FAILURE OF A FIREWALL DEVICE

(75) Inventors: Thomas H. Adams, San Antonio, TX (US); Michael T. Raftelis, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/903,344

(22) Filed: Oct. 13, 2010

(65) Prior Publication Data

US 2011/0030049 A1    Feb. 3, 2011

Related U.S. Application Data

(63) Continuation of application No. 11/226,115, filed on Sep. 14, 2005, now Pat. No. 7,870,602.

(51) Int. Cl.
*H04L 29/06* (2006.01)
(52) U.S. Cl. .......................... 726/11; 713/153
(58) Field of Classification Search .......... None
See application file for complete search history.

(56) References Cited

U.S. PATENT DOCUMENTS

| | | | |
|---|---|---|---|
| 6,078,957 A | 6/2000 | Adelman et al. | |
| 6,804,783 B1 | 10/2004 | Wesinger, Jr. et al. | |
| 6,880,089 B1 | 4/2005 | Bommareddy et al. | |
| 6,901,517 B1 | 5/2005 | Redmore | |
| 7,152,179 B1 | 12/2006 | Critchfield | |
| 7,870,602 B2 * | 1/2011 | Adams et al. | 726/11 |
| 2003/0041266 A1 | 2/2003 | Ke et al. | |
| 2003/0131262 A1 | 7/2003 | Goddard | |
| 2003/0200326 A1 | 10/2003 | Leighton et al. | |
| 2003/0200463 A1 | 10/2003 | McCabe | |
| 2004/0059942 A1 | 3/2004 | Xie | |
| 2004/0133772 A1 | 7/2004 | Render | |
| 2006/0195896 A1 | 8/2006 | Fulp et al. | |
| 2007/0061876 A1 | 3/2007 | Adams et al. | |

* cited by examiner

*Primary Examiner* — Gilberto Barron, Jr.
*Assistant Examiner* — Shaun Gregory
(74) *Attorney, Agent, or Firm* — Brooks Kushman P.C.

(57) ABSTRACT

A system includes first and second firewalls and a controller. The first firewall is configured to perform a firewall function on a first redundant input data packet and output the first input packet as a first redundant output data packet according to the firewall function. The second firewall is configured to perform the firewall function on a second redundant input data packet and output the second input packet as a second redundant output data packet according to the firewall function. The output packets are at least substantially similar when the firewall devices function properly. The controller is configured to receive the output packets from the firewalls, transmit at a given time one of the output packets, transmit the first output packet while the second firewall is failed, and transmit the second output packet while the first firewall is failed.

15 Claims, 4 Drawing Sheets

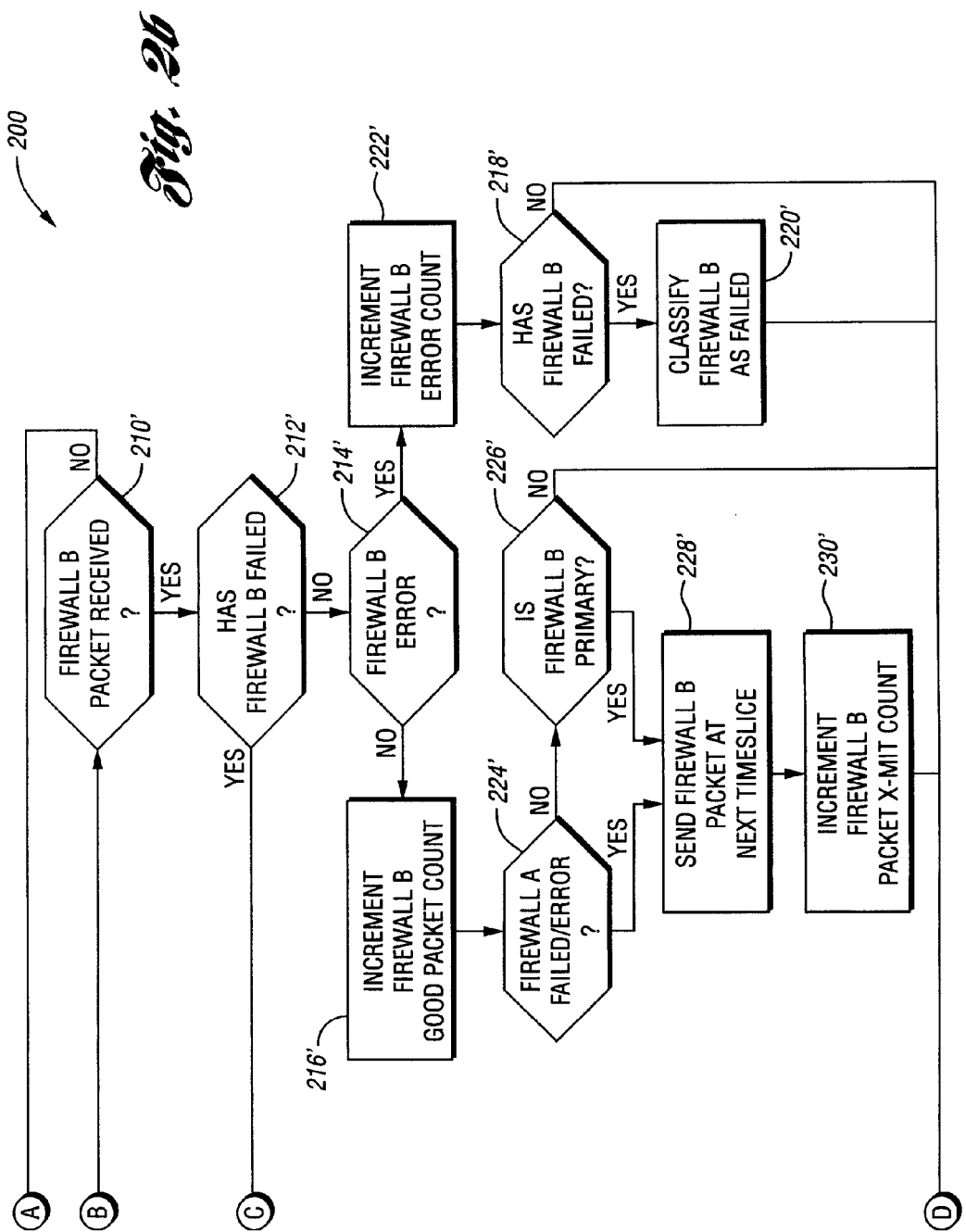

SYSTEM AND METHOD FOR REDUCING DATA STREAM INTERRUPTION DURING FAILURE OF A FIREWALL DEVICE

CROSS-REFERENCE TO RELATED APPLICATIONS

This is a continuation of U.S. Application No. 11/226,115, filed Sep. 14, 2005, now U.S. Patent No. 7,870,602, which is hereby incorporated by reference in its entirety.

BACKGROUND OF THE DISCLOSURE

1. Field of the Disclosure

This disclosure relates generally to a system and method of using a plurality of firewall devices for reducing data stream interruption during failure of a firewall device, and in at least one embodiment to such a system and method in a voice-over-internet-protocol communication network.

2. Background Art

Conventional firewall redundancy (i.e., active/standby redundancy) generally includes an active firewall and a standby firewall. In general, firewall functions are performed on an incoming data stream using only the active firewall. When a failure of the active firewall is detected, a switch-over sequence may occur such that the active firewall is disabled and the standby firewall becomes the active firewall. That is, the switch-over sequence generally re-assigns the firewall functions from the failed firewall to the standby firewall such that the standby firewall becomes the active firewall. During the switch-over sequence, a communication link between a source device and a target device is generally interrupted as communication through the failed firewall is dropped and communication through the standby firewall is established.

On many modern data networks, and on voice-over-internet-protocol (VOIP) networks in particular, interrupted communication during firewall switch-over may be problematic. For example, an inability to maintain existing telephone conversations and related signaling states during a firewall failure on a conventional VOIP network provide may result in subscriber dissatisfaction with the VOIP service. Furthermore, such an interruption may subject the VOIP network to "recall rush" which generally occurs when a large number of disconnected subscribers attempt to simultaneously re-establish connection to the VOIP network.

BRIEF DESCRIPTION OF THE DRAWINGS

The present disclosure, both as to its organization and manner of operation, together with further objects and advantages thereof, may be best understood with reference to the following description, taken in connection with the accompanied drawings in which.

DETAILED DESCRIPTION

Figure 1:
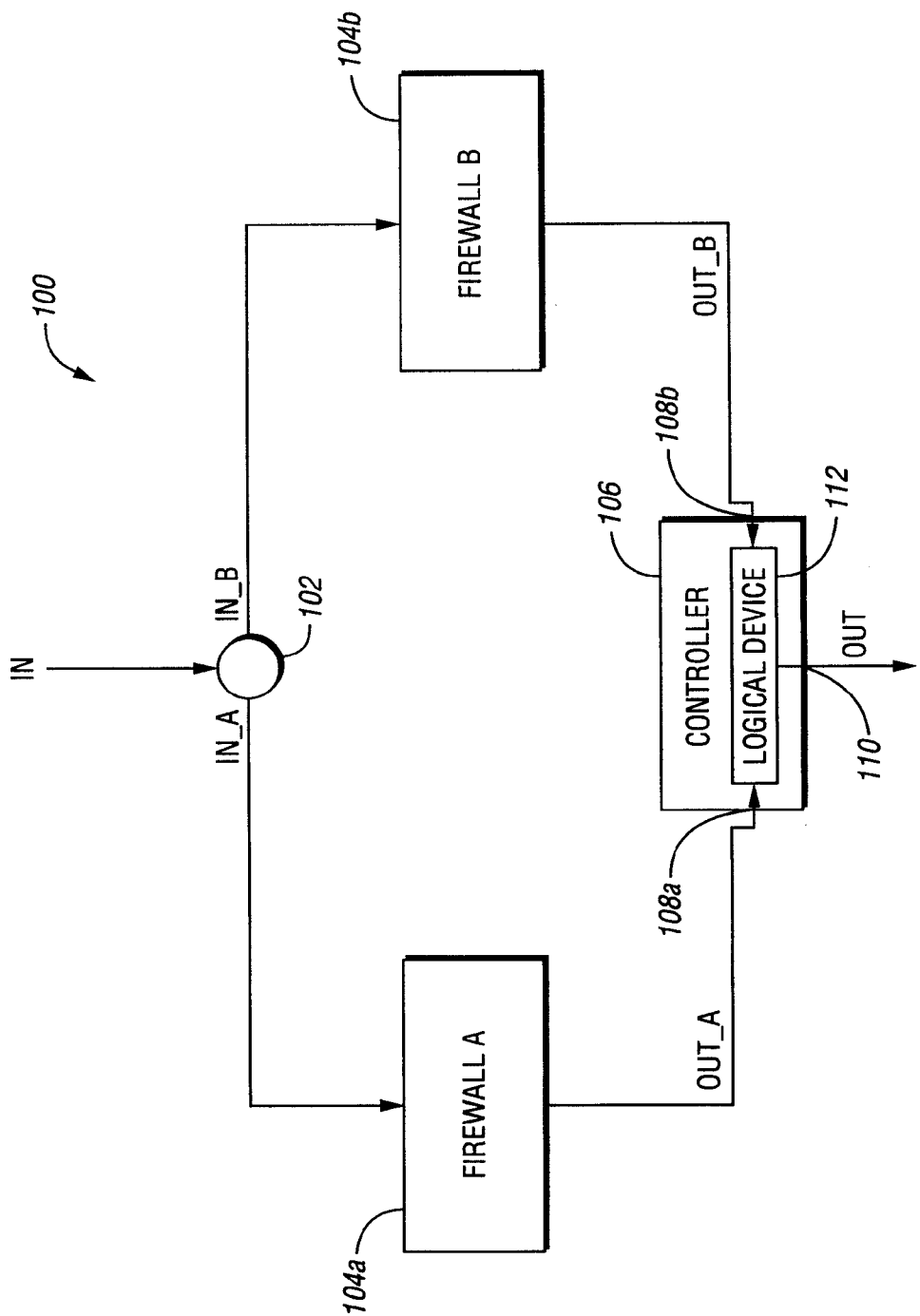
FIG. 1 illustrate a block diagram of a system for reducing data stream interruption during failure of a firewall according to at least one embodiment of the present disclosure.

The present disclosure generally provides a system and method of using a plurality of firewall devices for eliminating and/or reducing data stream interruption during failure of a firewall device. At least one embodiment of the present disclosure may provide "stateful redundancy" for a network such that all or substantially all signaling states of a data stream may be maintained during a firewall failure. In addition, at least one embodiment of the present disclosure may eliminate and/or reduce "recall rush" in a VOIP network. Furthermore, at least one embodiment of the present disclosure may provide a network, such as a VOIP network, having "five nines" redundancy (i.e., 99.999% availability). One or more advantages of the present disclosure may provide increased satisfaction among users (e.g., subscribers) of a network (e.g., VOIP network).

The present disclosure discloses an embodiment of a system having a first firewall device, a second firewall device, and a controller. The first firewall device is configured to perform a firewall function on a first redundant input data packet and output the first redundant input data packet as a first redundant output data packet according to the firewall function. The second firewall device is configured to perform the firewall function on a second redundant input data packet and output the second redundant input data packet as a second redundant output data packet according to the firewall function. The redundant output data packets are at least substantially similar when the firewall devices are functioning properly. The controller is configured to receive the redundant output data packets from the firewall devices, transmit at a given time one of the redundant output data packets to a target device, transmit the first redundant output data packet to the target device while the second firewall device is failed, and transmit the second redundant output data packet to the target device while the first firewall device is failed.

The present disclosure discloses an embodiment of a system having a splitter, first and second firewall devices, and a controller. The splitter is configured to duplicate an original data packet from a source device into first and second redundant input data packets such that the redundant input data packets are at least substantially similar to one another. The first firewall device is configured to receive the first redundant input data packet directly from the splitter, perform a firewall function on the first redundant input data packet, and output the first redundant input data packet solely as a first redundant output data packet according to the firewall function performed on the first redundant input data packet. The second firewall device is configured to receive the second redundant input data packet directly from the splitter, perform the firewall function on the second redundant input data packet, and output the second redundant input data packet solely as a second redundant output data packet according to the firewall function performed on the second redundant input data packet. The redundant output data packets are at least substantially similar to one another when the firewall devices are functioning properly. The controller is configured to receive the redundant output data packets from the firewall devices, transmit at a given time one of the redundant output data packets to a target device, transmit the first redundant output data packet to the target device while the second firewall device is failed, and transmit the second redundant output data packet to the target device while the first firewall device is failed.

The present disclosure discloses an embodiment of a method including the following. At a splitter, duplicating an original data packet from a source device into first and second redundant input data packets such that the redundant input data packets are at least substantially similar to one another. At a first firewall device, receiving the first redundant input data packet directly from the splitter, performing a firewall function on the first redundant input data packet, and outputting the first redundant input data packet solely as a first redundant output data packet according to the firewall function performed on the first redundant input data packet. At a second firewall device, receiving the second redundant input data packet directly from the splitter, performing the firewall function on the second redundant input data packet, and outputting the second redundant input data packet solely as a second redundant output data packet according to the firewall function performed on the second redundant input data packet. The redundant output data packets are at least substantially similar to one another when the firewall devices are functioning properly. At a controller, receiving the redundant output data packets from the firewall devices, transmitting at a given time one of the redundant output data packets to a target device, transmitting the first redundant output data packet to the target device while the second firewall device is failed, and transmitting the second redundant output data packet to the target device while the first firewall device is failed.

It is to be understood that the previous and subsequently disclosed embodiments are merely exemplary. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ the present disclosure.

Referring to FIG. 1, a block diagram of a system 100 for eliminating and/or reducing data stream interruption during failure of a firewall according to at least one embodiment of the present disclosure is provided. System 100 may comprise a signal splitting device 102, a plurality of firewall devices 104 (e.g., 104*a*, 104*b*, etc.), and/or a controller 106. System 100 may receive an electronic signal IN and may transmit an electronic signal OUT.

In at least one embodiment of the present disclosure, the signal IN may represent an audio and/or video stream generated by a voice-over-internet-protocol (i.e., VOIP) device (not shown) and transmitted over a network (e.g., the Internet, wide area network (WAN), local area network (LAN), and the like) to system 100. However, the signal IN may be generated by any appropriate device (i.e., data source device) (e.g., a computer, a cellular telephone, etc.), may be received by system 100 over any appropriate communication link (e.g., a hard-wired network, a wireless network, etc.), and may represent any appropriate information (i.e., data stream) to meet the design criteria of a particular application.

Signal splitting device 102 may be any appropriate device for duplicating the signal IN such that a plurality of redundant input signals (e.g., IN_A, IN_B) may be generated. Alternatively, a plurality of redundant input signals may be received by system 100 such that signal splitting device 102 may be omitted from system 100. During normal operation of system 100, each redundant input signal (e.g., IN_A) is generally equivalent to or substantially similar to each other redundant input signal (e.g., IN_B) such that any redundant input signal may be substituted for any other redundant input signal.

Each firewall device (i.e., firewall) 104 may be any appropriate device, such as a VOIP firewall, for preventing unauthorized data transfer between the data source device (i.e., source device) and a data target device (i.e. target device). Each firewall device 104 generally operates in an active mode (i.e., not in a standby mode) during normal operation of system 100. Accordingly, each firewall device 104 generally receives a redundant input signal, such as the signals IN_A or IN_B, performs one or more firewall function on the redundant input signal, and may output (i.e., transmit) the redundant input signal as a redundant output signal (e.g., OUT_A, OUT_B). Each redundant output signal may be identical to the corresponding redundant input signal or may be modified from the corresponding redundant input signal. However, under normal operation of system 100, each redundant output signal (e.g., OUT_A) is generally equivalent to or substantially similar to each other redundant output signal (e.g., OUT_B) such that any redundant output signal may be substituted for any other redundant output signal.

As will be understood by one of ordinary skill in the art, each redundant input signal and each redundant output signal generally comprise a series of redundant input data packets and redundant output data packets, respectively. Accordingly, the process of receiving/transmitting a redundant input/output signal generally comprises receiving/transmitting a series (i.e., sequence) of redundant input/output data packets, respectively.

Controller 106 (e.g., a VOIP network controller) may comprise any suitable logical device 112, such as a computer, a processor, an application specific integrated circuit, and the like which executes application programs and/or which performs other logical exercises. Controller 106 may further comprise one or more inputs 108 (e.g., 108*a*, 108*b*) and an output 110 electronically coupled to logical device 112. It is contemplated that all or part of the functionality of the components in controller 106 may be incorporated into a single controller, such as shown in FIG. 1, or may be distributed among a plurality of controllers (not shown). Controller 106 may be particularly suitable for performing a method 200, discussed in detail in connection with FIGS. 2(*a-b*).

Each controller input 108 may be electronically coupled to one or more firewall devices 104 for receiving a redundant data packet (e.g., redundant output data packets OUT_A, OUT_B) from (i.e., generated by) a firewall device 104 (e.g., 104*a*, 104*b*). Controller 106 generally identifies one or more valid redundant data packets from the one or more received redundant data packets (e.g., OUT_A, OUT_B). In addition, controller 106 may electronically couple output 110 to one of controller inputs 108 such that the valid redundant data packet is transmitted (i.e., routed) to the target device via output 110. Accordingly, system 100 may provide stateful redundancy of firewall devices 104 such that a valid redundant data packet may be transmitted to the target device during a failure of a firewall. That is, all or substantially all signaling states of a data stream between the source device and the target device may be maintained upon failure of one or more of firewall devices 104 such that communication between the source and target devices may be non-disruptively maintained (i.e. substantially maintained). Because the present disclosure uses a plurality of firewall devices 104 operating in an active mode to provide redundancy, the redundancy provided by the present disclosure may be referred to as "active/active" or "shared active" redundancy.

In at least one embodiment of the present disclosure, the source device or the target device may be a WAN (e.g., a VOIP WAN) and/or a device electronically coupled to the WAN. Similarly, in at least one embodiment of the present disclosure the source device or the target device may be a LAN (e.g., VOIP LAN) and/or a device electronically coupled to the LAN. Accordingly, system 100 may reside at an interface between (i.e., electronically couple) a WAN and a LAN and may provide uni-directional and/or bi-directional redundant (e.g., statefully redundant) communication between the source device and the target device, such as in a VOIP system. However, the source device and/or target device may be any appropriate devices for generating and/or receiving data to meet the design criteria of a particular application.

The components of system 100 may be distributed, as illustrated in FIG. 1, or integrated within a network device to meet the design criteria of a particular application.

Figure 2A:
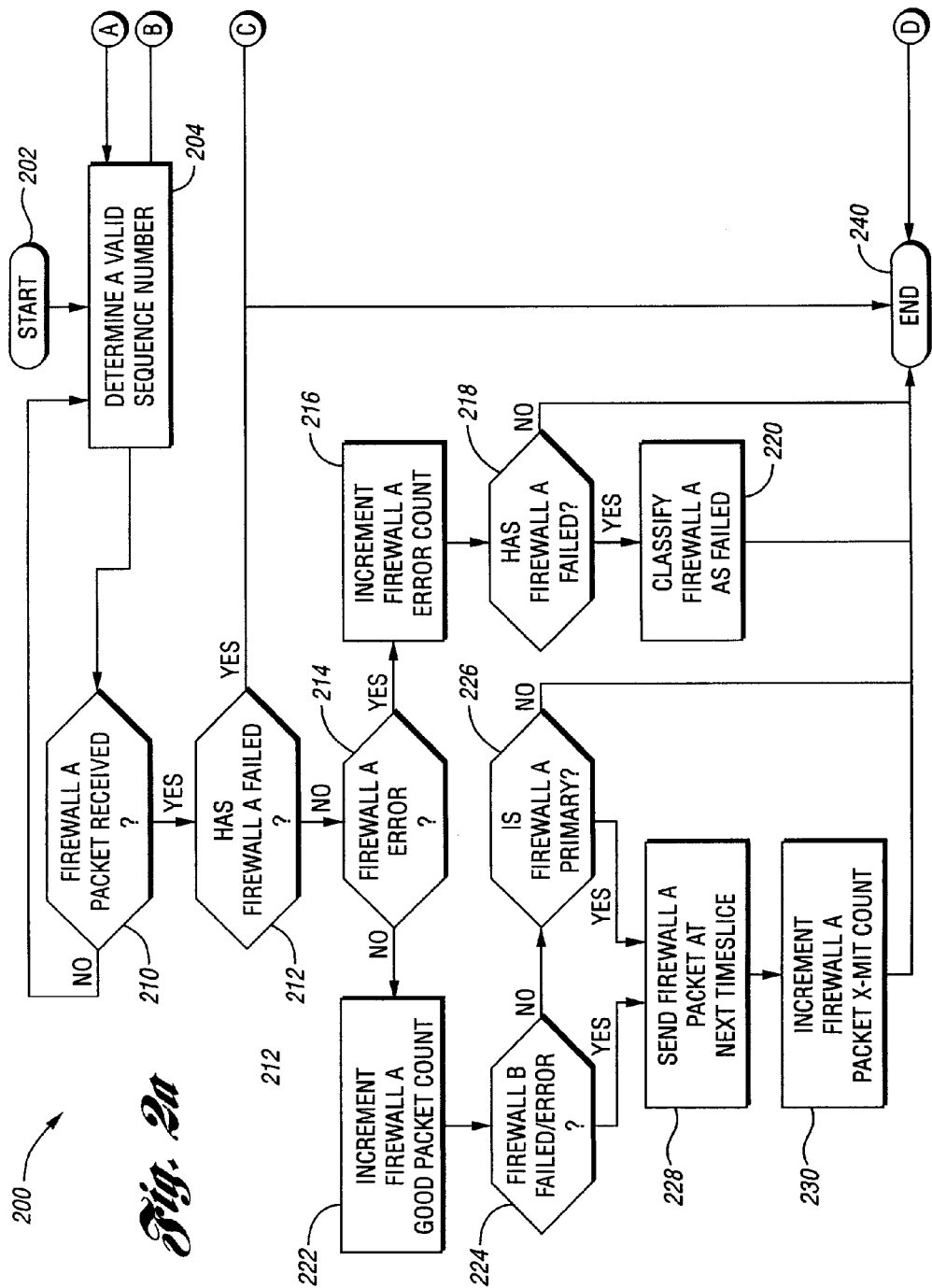
FIGS. 2(a-b) illustrate a flow diagram of a method for reducing data stream interruption during failure of a firewall according to at least one embodiment of the present disclosure.

Referring to FIGS. 2(*a-b*), a flow diagram of method 200 for reducing data stream interruption during failure of a firewall according to at least one embodiment of the present disclosure is shown. To facilitate understanding of the present disclosure, method 200 is illustrated in FIGS. 2(*a-b*) using a first (i.e., firewall A) and a second (i.e., firewall B) firewall device (i.e., firewall). However, any appropriate number of firewall devices (e.g., devices 104) may be implemented within the spirit and scope of the present disclosure. Each firewall device generally operates in an active mode during normal operation.

Method 200 may be advantageously implemented in connection with system 100, described previously in connection with FIG. 1, and/or any appropriate system to meet the design criteria of a particular application. In particular, method 200 is generally performed by a logical device, such as a component of controller 106. Method 200 generally includes a plurality of blocks or steps that may be performed serially. It is to be understood that blocks/steps pertaining to firewall B that are identical or similar to blocks/steps pertaining to firewall A have the same reference numeral except with a prime designation. As will be appreciated by one of ordinary skill in the art, the order of the block/steps shown in FIGS. 2(*a-b*) is exemplary and the order of one or more block/steps may be modified within the spirit and scope of the present disclosure. In addition, the blocks/steps of method 200 may be performed in at least one non-serial (or non-sequential) order, and one or more blocks/steps may be omitted to meet the design criteria of a particular application. Similarly, two or more of the blocks/steps of method 200 may be performed in parallel. Block 202 is an entry point into method 200.

At step 204, a valid sequence number may be determined. Sequence numbers are generally used to maintain a proper ordering of a series (i.e., sequence) of redundant data packets. Accordingly, the logical device may determine a valid sequence number for comparison with a sequence number retrieved from a real-time protocol (i.e., RTP) header of a redundant data packet. The valid sequence number generally corresponds to the next anticipated sequence number in a redundant data packet series. When a sequence number retrieved from the RTP header does not match the valid sequence number, the logical device may generate an error condition for the source (i.e., firewall) of the corresponding redundant data packet.

At decision block 210, the logical device generally determines when a first redundant data packet (e.g. OUT_A) is received from a first firewall device (e.g., firewall A) operating in an active mode during normal operation. Method 200 may fall through to step 212 when a first redundant data packet is received (i.e., the YES leg of decision block 210). Otherwise, method 200 may return to step 204 (i.e., the NO leg of decision block 210).

Similarly, at decision block 210', the logical device generally determines when a second redundant data packet (e.g. OUT_B) is received from a second firewall device (e.g., firewall B) operating in an active mode during normal operation. Method 200 may fall through to step 212' when a second redundant data packet is received (i.e., the YES leg of decision block 210'). Otherwise, method 200 may return to step 204 (i.e., the NO leg of decision block 210'). As previously discussed in connection with system 100 of FIG. 1, the first redundant data packet (e.g., OUT_A) is generally equivalent to or substantially similar to the second redundant data packet (e.g., OUT_B) such that either redundant data packet may be substituted for the other redundant data packet under normal operation.

At decision block 212, the logical device may determine whether the first firewall (e.g., firewall A) is classified as (i.e., known to be) "failed." Method 200 may fall through to step 240 (i.e., an exit point out of method 200) when first firewall is known to be in a failed state (i.e., the YES leg of decision block 212). Accordingly, the logical device may discard (i.e., ignore) the first redundant data packet when the first redundant data packet is received from the first firewall device and the first firewall device is classified as failed. Otherwise, method 200 may fall through to decision block 214 (i.e., the NO leg of decision block 212). In at least one embodiment of the present disclosure, implementing decision block 212 may conserve processing power of the logical device.

Similarly, at decision block 212', the logical device may determine whether the second firewall (e.g., firewall B) is classified as (i.e., known to be) "failed." Method 200 may fall through to step 240 (i.e., an exit point out of method 200) when the second firewall is known to be in a failed state (i.e., the YES leg of decision block 212'). Accordingly, the logical device may discard (i.e., ignore) the second redundant data packet when the second redundant data packet is received from the second firewall device and the second firewall device is classified as failed. Otherwise, method 200 may fall through to decision block 214' (i.e., the NO leg of decision block 212'). In at least one embodiment of the present disclosure, implementing decision block 212' may conserve processing power of the logical device.

At decision block 214, the logical device may determine whether an error has occurred at the first firewall (i.e., whether the first redundant data packet is valid). As previously described in connection with step 204, the logical device may generate an error condition for the source (i.e., first firewall, firewall A) of the first redundant data packet when a sequence number retrieved from the RTP header of the first redundant data packet does not match the valid sequence number. Method 200 generally proceeds to step 216 when an error is detected (i.e., the YES leg of decision block 214). Otherwise, method 200 generally proceeds to step 222 (i.e., the NO leg of decision block 214).

Similarly, at decision block 214', the logical device may determine whether an error has occurred at the second firewall (i.e., whether the second redundant data packet is valid). As previously described in connection with step 204, the logical device may generate an error condition for the source (i.e., second firewall, firewall B) of the second redundant data packet when a sequence number retrieved from the RTP header of the second redundant data packet does not match the valid sequence number. Method 200 generally proceeds to step 216' when an error is detected (i.e., the YES leg of decision block 214'). Otherwise, method 200 generally proceeds to step 222' (i.e., the NO leg of decision block 214').

At step 216, a first firewall error count (i.e., firewall A error count) may be incremented when the sequence number of the first redundant data packet varies from the valid sequence number (i.e., a first firewall error was detected at step 214). In one embodiment of the present disclosure, the first firewall error count may be reset to zero when the first firewall error count is constant for a first predetermined reset period of time (e.g., no error detected for twenty minutes). In another embodiment of the present disclosure, the first firewall error count may be reset to zero when the sequence number of a first redundant data packet matches the valid sequence number (i.e., first firewall error count reset on valid operation of the first firewall). However, any appropriate reset condition (i.e., trigger, occurrence, etc.) may be implemented to meet the design criteria of a particular application.

Similarly, at step 216', a second firewall error count (i.e., firewall B error count) may be incremented when the sequence number of the second redundant data packet varies from the valid sequence number (i.e., a second firewall error was detected at step 214'). In one embodiment of the present disclosure, the second firewall error count may be reset to zero when the second firewall error count is constant for a second predetermined reset period of time (e.g., no error detected for fifteen minutes). In another embodiment of the present disclosure, the second firewall error count may be reset to zero when the sequence number of a second redundant data packet matches the valid sequence number (i.e., second firewall error count reset on valid operation of the second firewall). However, any appropriate reset condition (i.e., trigger, occurrence, etc.) may be implemented to meet the design criteria of a particular application.

At step 218, one or more predefined fault conditions may be evaluated to determine whether a source of the first redundant data packet (i.e., first firewall, firewall A) has failed. The one or more predefined fault conditions may include manufacturer defined fault conditions and/or user defined fault condition. In one exemplary embodiment of the present disclosure, the first firewall device is classified as (i.e., determined to be) failed when the first firewall error count is greater than or equal to a predetermined first firewall error limit. In another exemplary embodiment, the first firewall device is classified as failed when the first firewall error count is incremented a first predetermined number of times during a first predetermined period of time (e.g. ten errors detected in five minutes). In yet another exemplary embodiment, the first firewall device is classified as failed when the sequence number of the first redundant data packet constantly (i.e., consistently) varies from the valid sequence number for a first threshold period of time (e.g., no valid sequence number detected for five minutes). However, any appropriate fault condition may be implemented to meet the design criteria of a particular application. Method 200 generally falls through to step 240 when the source of the first redundant data packet is not determined to be failed (i.e., the NO leg of decision block 218). Otherwise, method 200 generally proceeds to step 220.

Similarly, at step 218', one or more predefined fault conditions may be evaluated to determine whether a source of the second redundant data packet (i.e., second firewall, firewall B) has failed. The one or more predefined fault conditions may include manufacturer defined fault conditions and/or user defined fault condition. In one exemplary embodiment of the present disclosure, the second firewall device is classified as (i.e., determined to be) failed when the second firewall error count is greater than or equal to a predetermined second firewall error limit. In another exemplary embodiment, the second firewall device is classified as failed when the second firewall error count is incremented a second predetermined number of times during a second predetermined period of time (e.g. twelve errors detected in four minutes). In yet another exemplary embodiment, the second firewall device is classified as failed when the sequence number of the second redundant data packet constantly (i.e., consistently) varies from the valid sequence number for a second threshold period of time (e.g., no valid sequence number detected for ten minutes). However, any appropriate fault condition may be implemented to meet the design criteria of a particular application. Method 200 generally falls through to step 240 when the source of the second redundant data packet is not determined to be failed (i.e., the NO leg of decision block 218'). Otherwise, method 200 generally proceeds to step 220'.

At step 220, the logical device may classify the first firewall (e.g., firewall A) as "failed." In at least one embodiment of the present disclosure, the first firewall may remain classified as "failed" until a reset condition and/or operator initiated reset request is received by the logical device. From step 220, method 200 generally proceeds to step 240.

Similarly, at step 220', the logical device may classify the second firewall (e.g., firewall B) as "failed." In at least one embodiment of the present disclosure, the second firewall may remain classified as "failed" until a reset condition and/or operator initiated reset request is received by the logical device. From step 220', method 200 generally proceeds to step 240.

At step 222, a first firewall good packet count may be incremented when the sequence number of the first redundant data packet matches the valid sequence number (i.e., a first firewall error was not detected at step 214). In at least one embodiment of the present disclosure, the first firewall good packet count may be used to track performance of the first firewall device. From step 222, method 200 generally falls through to decision block 224.

Similarly, at step 222', a second firewall good packet count may be incremented when the sequence number of the second redundant data packet matches the valid sequence number (i.e., a second firewall error was not detected at step 214'). In at least one embodiment of the present disclosure, the second firewall good packet count may be used to track performance of the second firewall device. From step 222', method 200 generally falls through to decision block 224'.

At decision block 224, the logical device may determine whether the second firewall device (i.e., second redundant data packet source) has failed (i.e., classified as failed) and/or whether an error has occurred at the second firewall (i.e., the second redundant data packet is invalid, a second firewall error was detected at step 214'). When the second redundant data packet source has failed and/or the second redundant data packet is invalid, method 200 may proceed to step 228 such that the valid first redundant data packet may be transmitted to the target device. Otherwise, method 200 generally falls through to step 226.

Similarly, at decision block 224', the logical device may determine whether the first firewall device (i.e., first redundant data packet source) has failed (i.e., classified as failed) and/or whether an error has occurred at the first firewall (i.e., the first redundant data packet is invalid, a first firewall error was detected at step 214). When the first redundant data packet source has failed and/or the first redundant data packet is invalid, method 200 may proceed to step 228' such that the valid second redundant data packet may be transmitted to the target device. Otherwise, method 200 generally falls through to step 226'.

At decision block 226, the logical device may determine whether the first firewall is the primary firewall. When the first firewall is the primary firewall, a corresponding valid first redundant data packet may be transmitted to the target device. By designating a firewall as a primary firewall, a valid redundant data packet may be selected from a plurality of valid and/or potentially valid redundant data packets for subsequent transmission to the target device. In one embodiment of the present disclosure, the first firewall device may be designated as the primary firewall device in response to a first operator initiated command. In another embodiment of the present disclosure, the first firewall device may be designated as the primary firewall device when the logical device (e.g., controller 106) determines that the sequence number of the first redundant data packet matches the valid sequence number prior to determining whether the sequence number of the second redundant data packet matches the valid sequence number. Such an embodiment may increase data throughput as the first available valid redundant data packet would be transmitted. However, any appropriate trigger (i.e., action, occurrence, condition, etc.) may be used to determine the primary firewall device to meet the design criteria of a particular application. Accordingly, selection of a firewall (e.g., first firewall, second firewall) as the "primary firewall" may be substantially static, such as manual selection by operator initiated command, or dynamic, such as automatic selection by the logical device based on a predefined criteria. Method 200 generally proceeds to step 240 when the first firewall is not the primary firewall (i.e., the NO leg of the decision block 226). Otherwise, method 200 generally falls through to block 228 (i.e., the YES leg of decision block 226).

Similarly, at decision block 226', the logical device may determine whether the second firewall is the primary firewall. When the second firewall is the primary firewall, a corresponding valid second redundant data packet may be transmitted to the target device. In one embodiment of the present disclosure, the second firewall device may be designated as the primary firewall device in response to a second operator initiated command. In another embodiment of the present disclosure, the second firewall device may be designated as the primary firewall device when the logical device determines that the sequence number of the second redundant data packet matches the valid sequence number prior to determining whether the sequence number of the first redundant data packet matches the valid sequence number. Such an embodiment may increase data throughput as the first available valid redundant data packet would be transmitted. However, any appropriate trigger may be used to determine the primary firewall device to meet the design criteria of a particular application. Method 200 generally proceeds to step 240 when the second firewall is not the primary firewall (i.e., the NO leg of the decision block 226'). Otherwise, method 200 generally falls through to block 228' (i.e., the YES leg of decision block 226').

At step 228, the first redundant data packet may be transmitted to the target device, for example, during the next available communication time-slice. From step 228, method 200 generally falls through to step 230.

Similarly, at step 228', the second redundant data packet may be transmitted to the target device, for example, during the next available communication time-slice. From step 228', method 200 generally falls through to step 230'.

At step 230, the first firewall packet transmit count may be incremented when the first redundant data packet is transmitted to the target device. In at least one embodiment of the present disclosure, the first firewall packet transmit count may be used to track performance of the first firewall device. From step 230, method 200 generally falls through to step 240.

Similarly, at step 230', the second firewall packet transmit count may be incremented when the second redundant data packet is transmitted to the target device. In at least one embodiment of the present disclosure, the second firewall packet transmit count may be used to track performance of the second firewall device. From step 230', method 200 generally falls through to step 240.

Step 240 is an exit point out of method 200.

Figure 3:
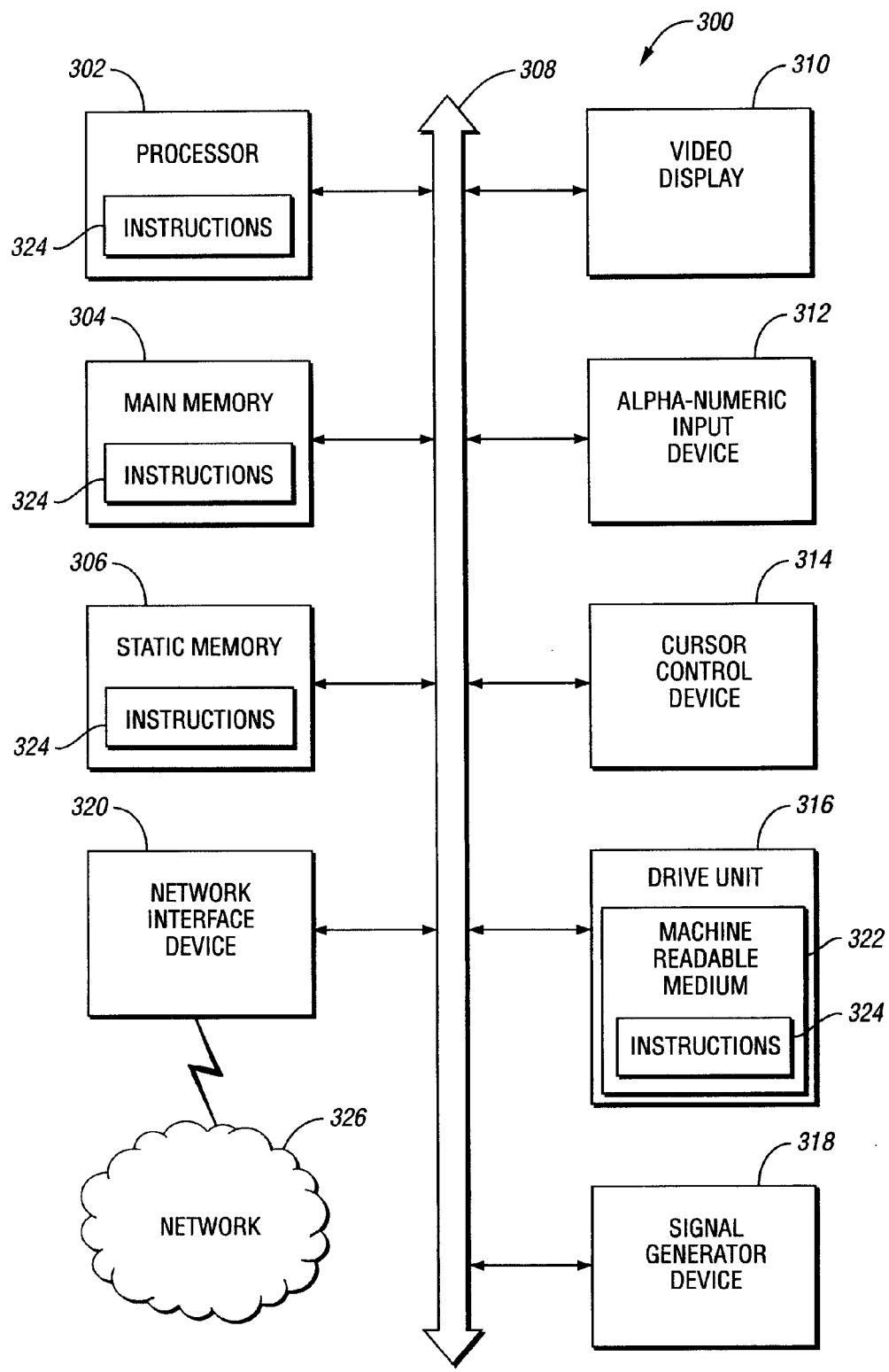
FIG. 3 illustrates a diagrammatic representation of a machine in the form of a computer system.

FIG. 3 is a diagrammatic representation of a machine in the form of a computer system 300 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

Computer system 300 may include a processor 302 (e.g., a central processing unit (CPU), a graphics processing unit (GPU), or both), a main memory 304 and a static memory 306, which communicate with each other via a bus 308. Computer system 300 may further include a video display unit 310 (e.g., a liquid crystal display (LCD), a flat panel, a solid state display, or a cathode ray tube (CRT)). Computer system 300 may include an input device 312 (e.g., a keyboard), a cursor control device 314 (e.g., a mouse), a disk drive unit 316, a signal generation device 318 (e.g., a speaker or remote control) and a network interface device 320.

Disk drive unit 316 may include a machine-readable medium 322 on which is stored one or more sets of instructions (e.g., software 324) embodying any one or more of the methodologies or functions described herein, including those methods illustrated in herein above. Instructions 324 may also reside, completely or at least partially, within main memory 304, static memory 306, and/or within processor 302 during execution thereof by computer system 300. Main memory 304 and processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over network 326 using instructions 324. Instructions 324 may further be transmitted or received over a network 326 via network interface device 320.

While machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the present disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the present disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Accordingly, the present disclosure may provide a system (e.g., system 100) and method (e.g., method 200) of using a plurality of firewall devices for eliminating and/or reducing data stream interruption during failure of a firewall device. The system and method may provide uni-direction and/or bi-directional firewall redundancy. That is, the present disclosure may eliminate and/or reduce data stream interruption during uni-directional and/or bi-directional data communication. The terms data source device and data target device have been used in the above disclosure for clarity. It is to be understood that any particular device may function as a data source device, a data target device, or both.

At least one embodiment of the present disclosure may provide "stateful redundancy" for a network such that all or substantially all signaling states of a data stream may be maintained during a firewall failure. In addition, at least one embodiment of the present disclosure may eliminate and/or reduce "recall rush" in a VOIP network. Furthermore, at least one embodiment of the present disclosure may provide a network, such as a VOIP network, having "five nines" redundancy (i.e., 99.999% availability).

It should be understood that system 100 and method 200 are discussed in the context of first and second redundant firewalls for the purpose of facilitating an understanding of the present disclosure. However, any appropriate number of firewall devices may be implemented within the spirit and scope of the present disclosure.

While embodiments of the disclosure have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

What is claimed is:

1. A system comprising:
   a first firewall device configured to perform a firewall function of a plurality of different firewall functions on a first redundant input data packet and output the first redundant input data packet as a first redundant output data packet according to the firewall function;
   a second firewall device configured to perform only the same firewall function on a second redundant input data packet and output the second redundant input data packet as a second redundant output data packet according to the firewall function;
   wherein the redundant input data packets are at least substantially similar;

wherein the redundant output data packets are at least substantially similar when the firewall devices are functioning properly; and a controller configured to receive the redundant output data packets from the firewall devices, transmit at a given time one of the redundant output data packets to a target device, transmit the first redundant output data packet to the target device while the second firewall device is failed, and transmit the second redundant output data packet to the target device while the first firewall device is failed.

2. The system of claim 1 wherein:
the target device is a VoIP target device.

3. The system of claim 2 wherein:
the VoIP target device is one of a VoIP local area network and a VoIP wide area network.

4. The system of claim 2 wherein:
each firewall device is a VoIP firewall device.

5. The system of claim 1 wherein:
the controller is further configured to discard the first redundant output data packet when the first firewall device is failed and discard the second redundant output data packet when the second firewall device is failed.

6. A system comprising:
a splitter configured to duplicate an original data packet from a source device into first and second redundant input data packets such that the redundant input data packets are at least substantially similar to one another;

a first firewall device configured to receive the first redundant input data packet directly from the splitter, perform a firewall function of a plurality of different firewall functions on the first redundant input data packet, and output the first redundant input data packet solely as a first redundant output data packet according to the firewall function performed on the first redundant input data packet;

a second firewall device configured to receive the second redundant input data packet directly from the splitter, perform only the same firewall function on the second redundant input data packet, and output the second redundant input data packet solely as a second redundant output data packet according to the firewall function performed on the second redundant input data packet, wherein the redundant output data packets are at least substantially similar to one another when the firewall devices are functioning properly; and a controller configured to determine a valid sequence number, receive the redundant output data packets from the firewall devices, obtain sequence numbers from the redundant output data packets, transmit at a given time one of the redundant output data packets to a target device, transmit the first redundant output data packet to the target device while the sequence number from the first redundant output data packet matches the valid sequence number and the sequence number from the second redundant output data packet varies from the valid sequence number, and transmit the second redundant output data packet to the target device while the sequence number from the second redundant output data packet matches the valid sequence number and the sequence number from the first redundant output data packet varies from the valid sequence number.

7. The system of claim 6 wherein:
the source device is a VoIP source device and the target device is a VoIP target device.

8. The system of claim 7 wherein:
the VoIP source device is one of a VoIP local area network and a VoIP wide area network; and
the VoIP target device is the other one of the VoIP local area network and the VoIP wide area network.

9. The system of claim 7 wherein:
each firewall device is a VoIP firewall device.

10. The system of claim 6 wherein:
the controller is further configured to discard the first redundant output data packet when the first firewall device is failed and discard the second redundant output data packet when the second firewall device is failed.

11. A method comprising:
at a splitter, duplicating an original data packet from a source device into first and second redundant input data packets such that the redundant input data packets are at least substantially similar to one another;

at a first firewall device, receiving the first redundant input data packet directly from the splitter, performing a firewall function of a plurality of different firewall functions on the first redundant input data packet, and outputting the first redundant input data packet solely as a first redundant output data packet according to the firewall function performed on the first redundant input data packet;

at a second firewall device, receiving the second redundant input data packet directly from the splitter, performing only the same firewall function on the second redundant input data packet, and outputting the second redundant input data packet solely as a second redundant output data packet according to the firewall function performed on the second redundant input data packet, wherein the redundant output data packets are at least substantially similar to one another when the firewall devices are functioning properly;

at a controller, determining a valid sequence number, receiving the redundant output data packets from the firewall devices, obtaining sequence numbers from the redundant output data packets, transmitting at a given time one of the redundant output data packets to a target device, transmitting the first redundant output data packet to the target device while the sequence number from the first redundant output data packet matches the valid sequence number and the sequence number from the second redundant output data packet varies from the valid sequence number, and transmitting the second redundant output data packet to the target device while the sequence number from the second redundant output data packet matches the valid sequence number and the sequence number from the first redundant output data packet varies from the valid sequence number.

12. The method of claim 11 wherein:
the source device is a VoIP source device and the target device is a VoIP target device.

13. The method of claim 12 wherein:
the VoIP source device is one of a VoIP local area network and a VoIP wide area network; and
the VoIP target device is the other one of the VoIP local area network and the VoIP wide area network.

14. The method of claim 12 wherein:
each firewall device is a VoIP firewall device.

15. The method of claim 11 further comprising:
at the controller, discarding the first redundant output data packet when the first firewall device is failed and discarding the second redundant output data packet when the second firewall device is failed.

* * * * *